Figure 1:
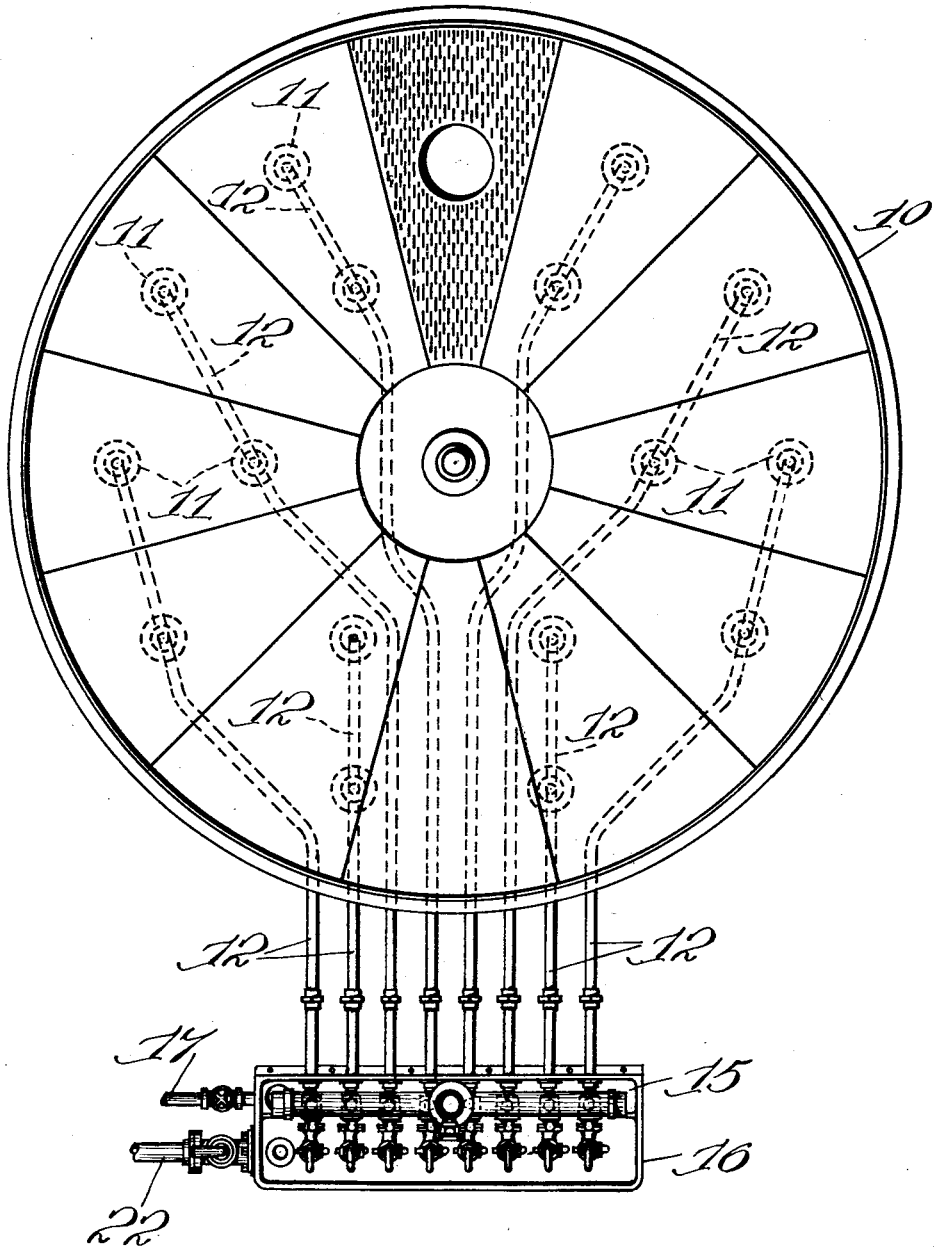

June 4, 1935. A. R. KELLER 2,003,892
EXAMINATION AND CONTROL DEVICE FOR WORT HANDLING EQUIPMENT
Filed Jan. 2, 1934 4 Sheets-Sheet 2

INVENTOR
Andreas R. Keller.
By Dyrenforth, Lee, Chritton & Wiles
Attys.

June 4, 1935. A. R. KELLER 2,003,892
EXAMINATION AND CONTROL DEVICE FOR WORT HANDLING EQUIPMENT
Filed Jan. 2, 1934 4 Sheets-Sheet 3

INVENTOR
Andreas R. Keller.
By Dyrenforth, Lee, Chritton & Wiles
Attys.

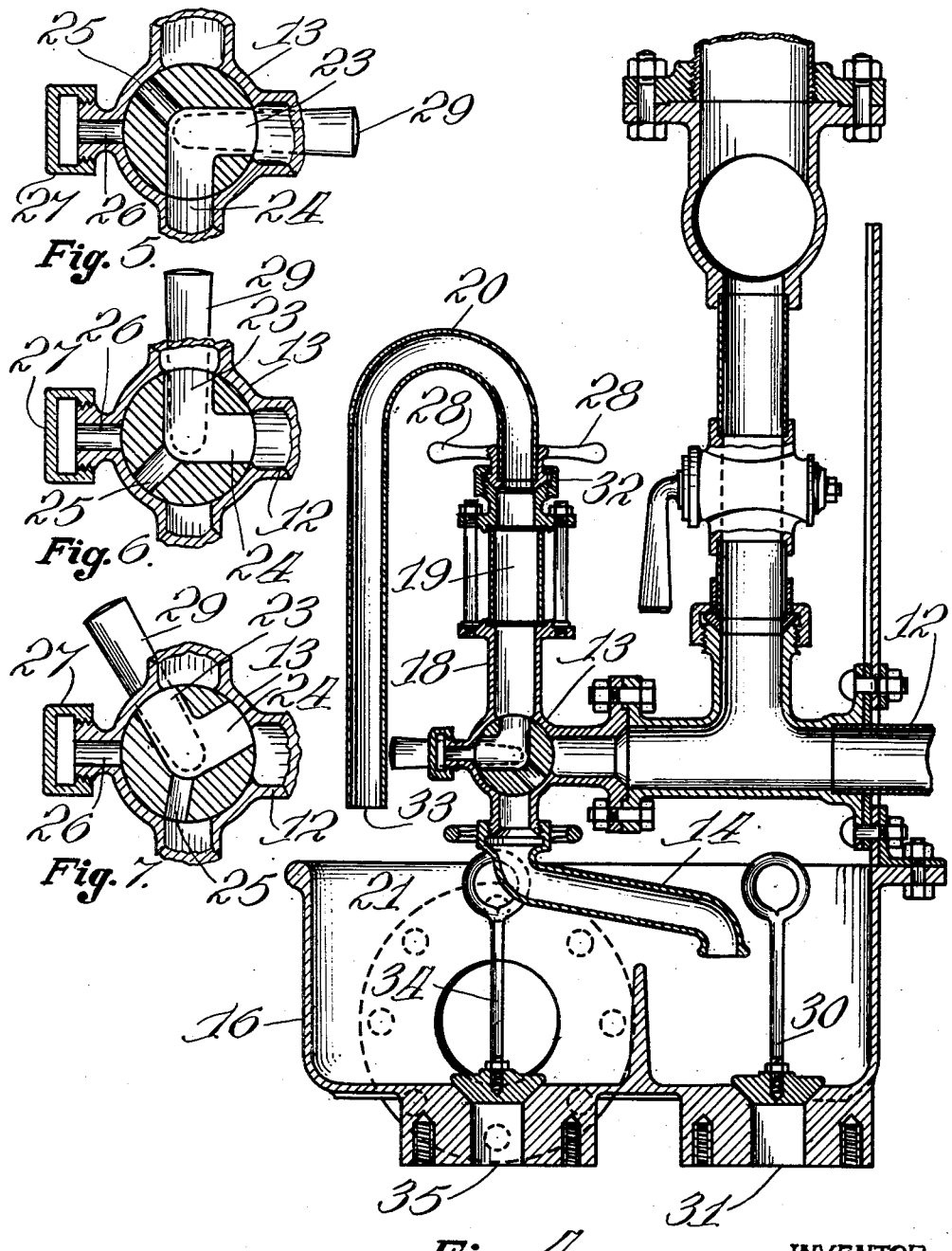

Patented June 4, 1935

2,003,892

UNITED STATES PATENT OFFICE 2,003,892

EXAMINATION AND CONTROL DEVICE FOR WORT HANDLING EQUIPMENT

Andreas R. Keller, Lombard, Ill.

Application January 2, 1934, Serial No. 705,023

1 Claim. (Cl. 137—78)

My invention is an improvement in wort handling and examination equipment as used in the brewing industry in connection with the mash tank and grant. My device is an improvement on previous brewing practice in that it permits examination of the wort while in a state of flow through the wort pipes, and in that it permits immediate and individual adjustment of the direction and rate of flow in each of the wort pipes.

In the drawings—

Figure 2:
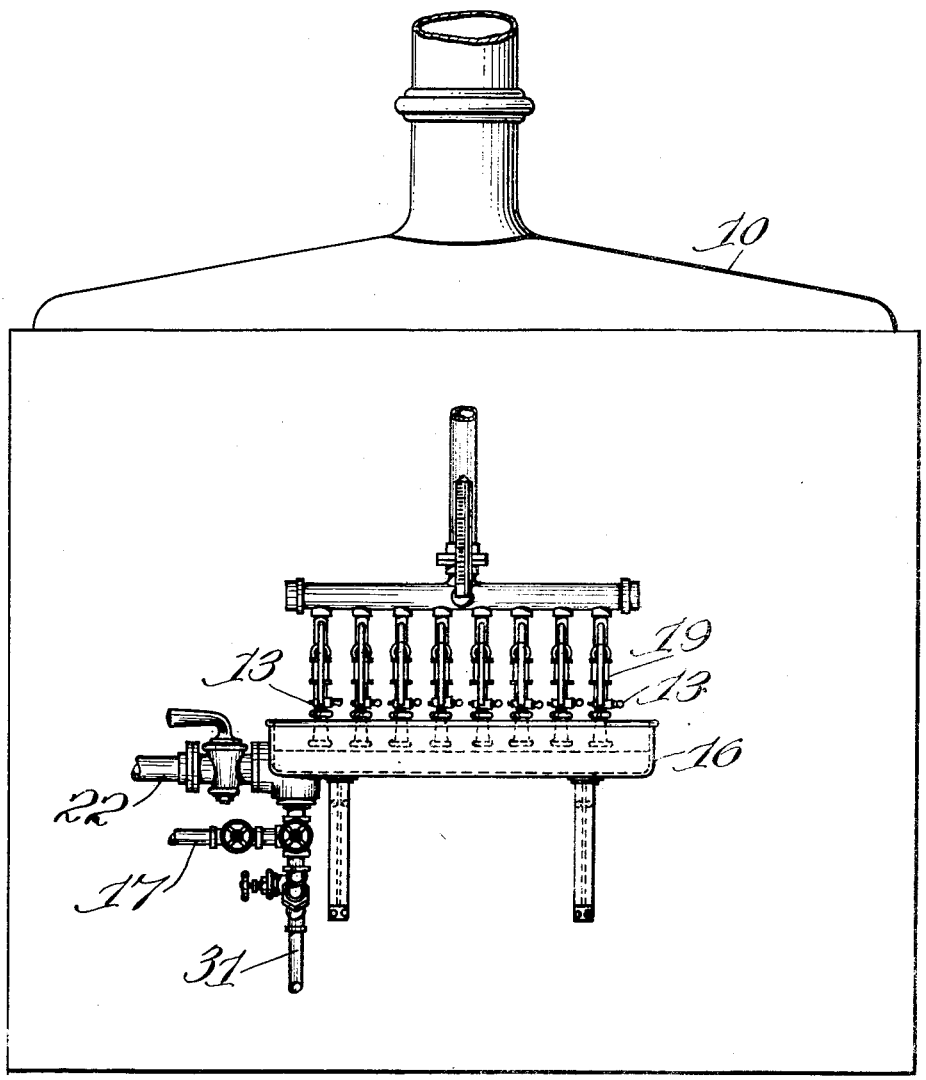
Figure 3:
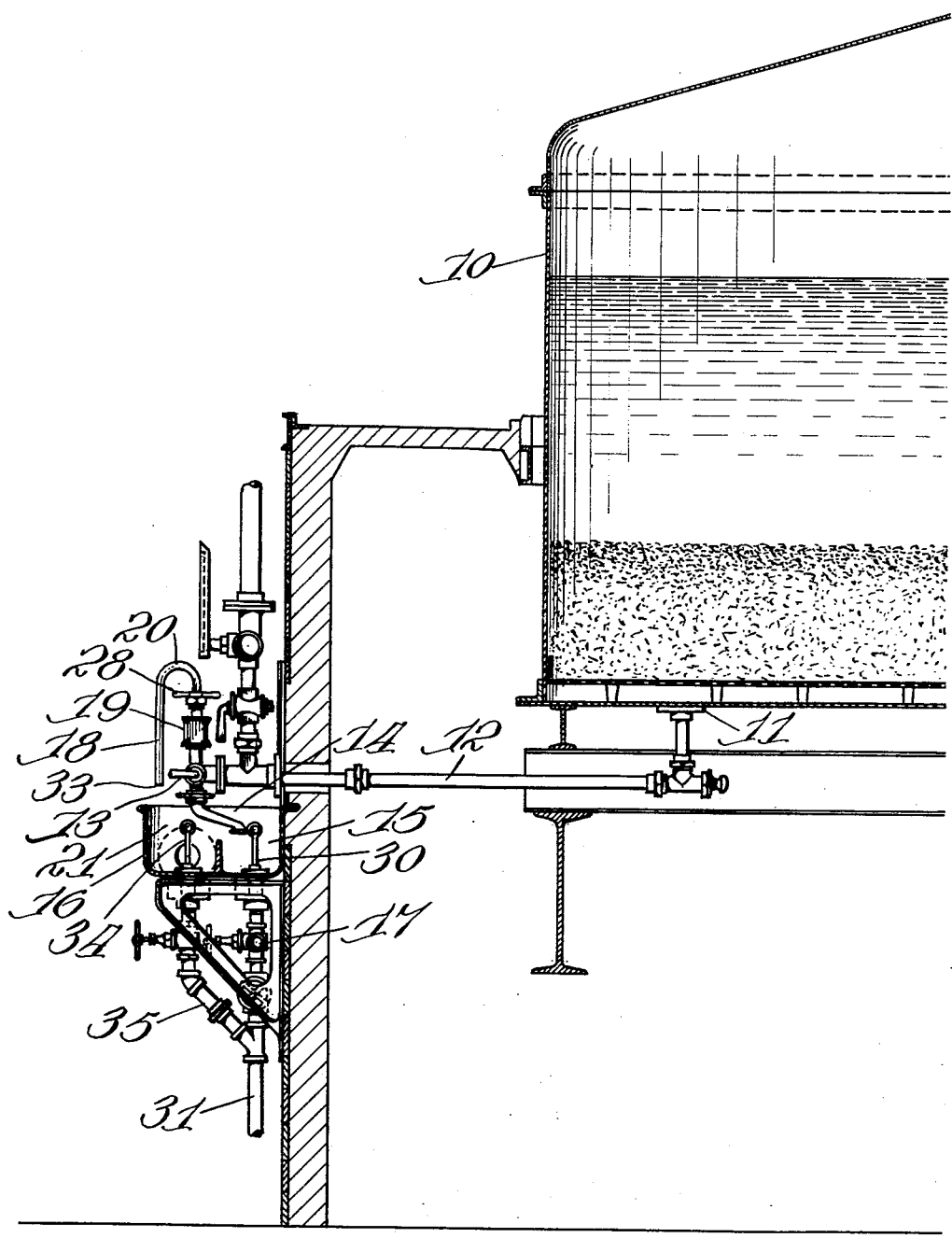

Figure 1 is a top plan view of the mash tank, wort pipes and grant; Fig. 2 is a front elevation of the grant and of the wort discharge pipes; Fig. 3 is a side elevation, partly in section, of the mash tank, the grant, and the wort flow pipes; Fig. 4 is a fragmentary vertical sectional view of the grant and the wort discharge pipes; Fig. 5 is a vertical sectional view in detail of the three-way valve in the washout position; Fig. 6 is a vertical sectional view of the three-way valve in the clear wort position; and Fig. 7 is a vertical sectional view of the three-way valve positioned to permit the outlet of the cloudy wort, and also to provide a head of liquid visible through the observation glass.

In my device, the mash tank 10 has drain openings 11 positioned at various points in its bottom, said drain openings connecting with wort pipes 12. The wort pipes 12 have in them three-way valves 13 which may be operated by hand by conventional handles 29. When the three-way valve 13 is in the position illustrated in Fig. 7, the wort flows in through opening 24 and thence divides, part flowing upwardly through opening 23 and part draining downwardly through opening 25 through the cloudy wort drain pipe 14 and into the cloudy wort compartment 15 of the grant 16.

In the normal sequence of brewing, the cloudy wort flows from this compartment 15 through the cloudy wort pipe 17 into a pump which forces it back into the mash tank 10. That part of the liquid which flowed through opening 23 rises in the clear wort pipe 18 and shows through the observation glass 19. At such time as the wort in the observation glass becomes clear, the valve 13 is changed to the position shown in Fig. 6. In this position, the liquid enters through opening 24 and, opening 25 being closed, passes upwardly through opening 23 into the clear wort pipe 18, around the bend 20, and thence drains into the clear wort compartment 21 of the grant 16. The clear wort compartment has an outlet pipe 22 which conducts the wort to the brewing kettle.

The valve 13 has a third position, illustrated in Fig. 5. This position is used when it is desired to wash out the wort pipes and results in the waste fluid running into the cloudy wort compartment 15, where the removal of the stopper 30 permits it to drain out through the waste pipe 31.

The clear wort pipe 18 and the clear wort compartment 21 may be flushed by setting the valve 13 in the position illustrated in Fig. 6, the cleaning liquid draining out through the waste pipe 35 after the removal of the stopper 34.

The valve 13 is a conventional type of three-way valve having two of its passages (23 and 24) lying at right angles to each other, and a third passage 25 positioned at an angle of 135° to each of the other passages. The unused opening 26 is covered with a cap 27 to prevent any possible flow of liquid therefrom. The positioning of the passages in the three-way valve permits adjustment as illustrated in Fig. 7, so that the major portion of the wort flowing in from the wort pipe 12 drains out through the passage 25 into the cloudy wort pipe 14, yet sufficient flow is maintained through passage 23 into the clear wort pipe 18 to keep the liquid visible in the observation glass 19, but not enough to cause it to flow over the bend 20.

An alternative form of my device has a swivel coupling 32 in the clear wort pipe immediately above the observation glass 19. Attached to the pipe above the swivel coupling are dog ear handles 28. In this form of my invention, the passage 25 of the valve 13 is not used, and may be omitted if it is so desired. The valve is set in the position illustrated in Fig. 6, or slightly off-set if it is desired to lessen the flow. The change of flow in this case is accomplished by turning the dog ear handles 28 so that when the wort shows cloudy in the observation glass 19, the outlet 33 of the clear wort pipe is turned to be in positon over the cloudy wort compartment 15; whereas when the wort shows clear in the observation glass 19 the clear wort pipe is swung by means of the handle 28 so that the opening 33 drains into the clear wort compartment 21. When it is desired to wash out the equipment the valve 13 is set in the position illustrated in Fig. 5, so that the waste may drain through the pipe 14 and, the stopper 30 having been removed, out the drain pipe 31.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intenton to claim all novelty inherent in my invention as broadly as permissible, in view of the prior art.

What I regard as new, and desire to secure by Letters Patent, is:

In brewing apparatus of the character described; a tub; a grant having two compartments, one of said compartments having a return to said tub, and the other of said compartments being adapted to discharge into a brew kettle; a wort pipe leading from said tub and adapted to discharge into said grant; an observation glass in said wort pipe whereby the liquid in said pipe may be visually examined to determine whether it should be discharged into said brew kettle; a swivel coupling near the end of said wort pipe; and handle means whereby the outlet of said pipe may be manually directed to discharge into either of said compartments.

ANDREAS R. KELLER.